Sept. 23, 1958     H. P. HESLER     2,853,278
ANTI-VIBRATION CRATE FOR HEAT EXCHANGE TUBES
Filed April 5, 1956     2 Sheets-Sheet 1
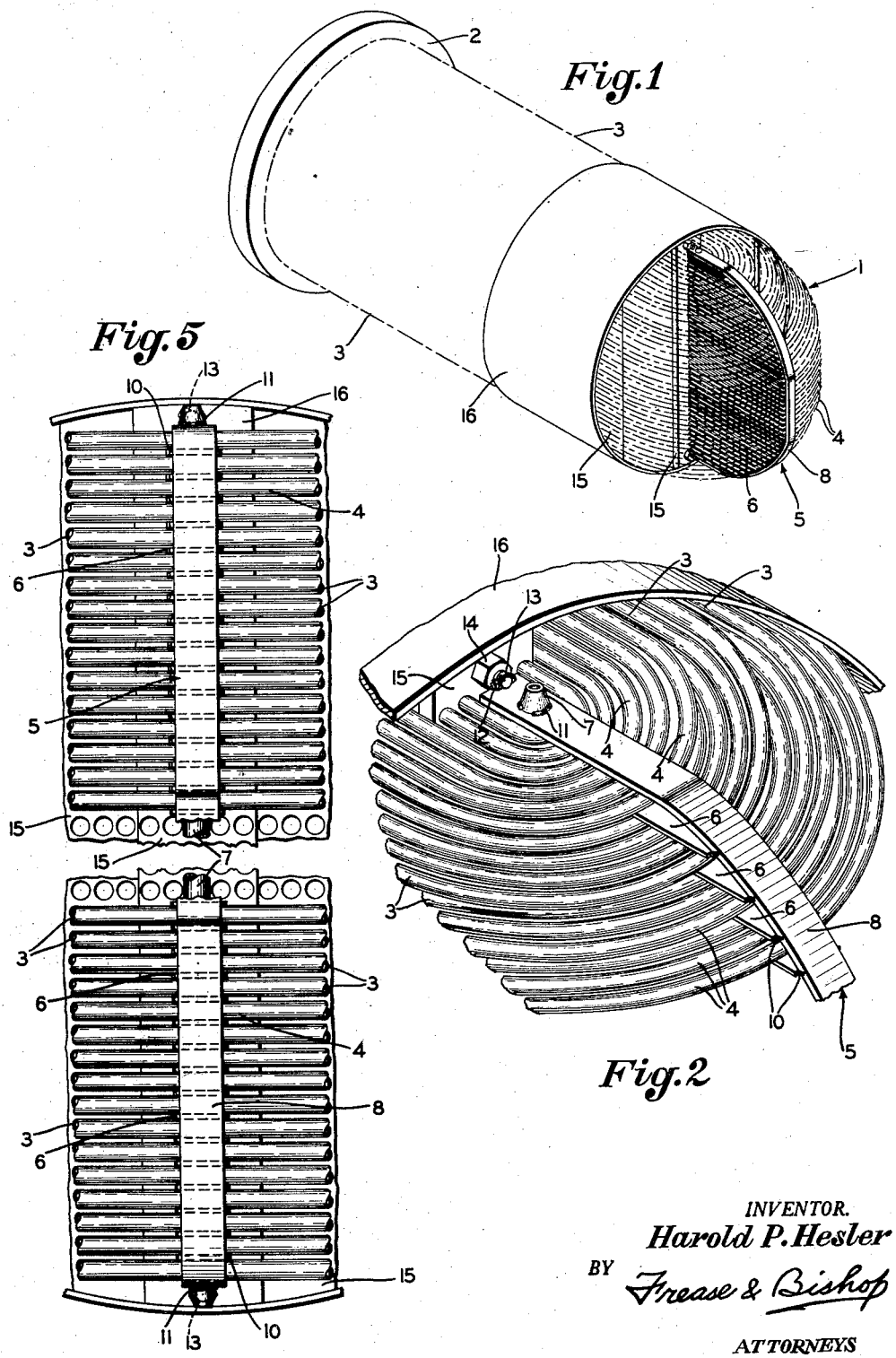
INVENTOR.
Harold P. Hesler
BY Frease & Bishop
ATTORNEYS

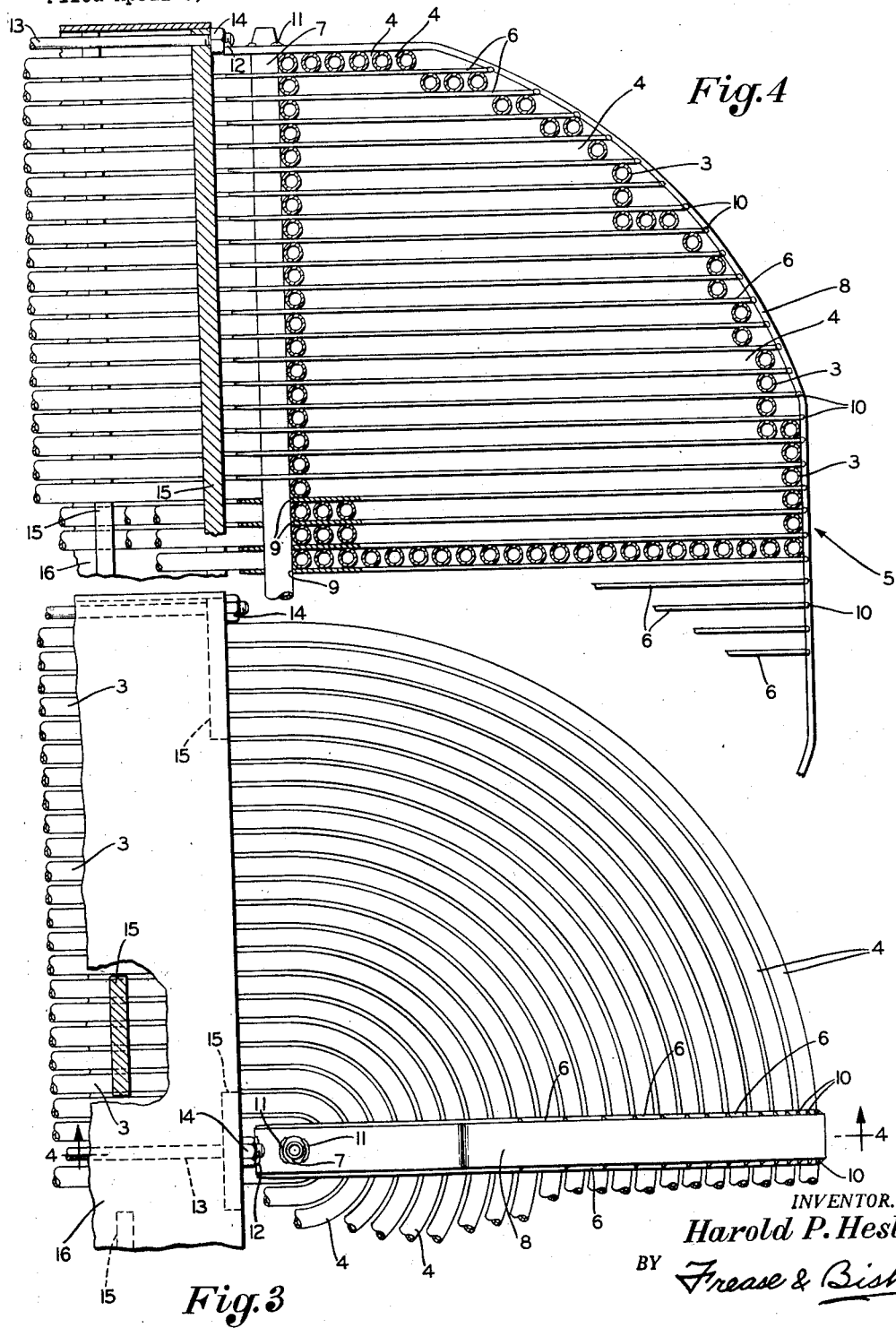

United States Patent Office 2,853,278
Patented Sept. 23, 1958

2,853,278

ANTI-VIBRATION CRATE FOR HEAT EXCHANGE TUBES

Harold P. Hesler, Fairway, Kans., assignor to The Griscom-Russell Company, Massillon, Ohio, a corporation of Delaware Application April 5, 1956, Serial No. 576,364

4 Claims. (Cl. 257—239)

This invention relates to a spacer construction for preventing vibration between tubes of a heat exchanger.

Tubes for heat exchangers are frequently damaged beyond repair due to excessive rubbing and knocking against each other. This is particularly true with U-shaped tubes that are small and thin-walled.

Vibration and knocking between tubes may occur during shipment. A bundle of assembled U-shaped tubes is often shipped to a customer who subsequently installs the assembly in a heat exchanger at the place of ultimate use. During shipment the closely spaced tubes may be shaken so much that the tubes knock or vibrate against each other excessively and cause early failure.

Vibration and knocking between tubes may also occur during use. The rapid flow of fluid through and about the tubes frequently sets off vibration between the tubes. Here again excessive vibration has been found to cause the tubes to wear through and fail at the U-bends.

Heretofore, various means for preventing vibration between tubes have been proposed. Some proposals were designed for preventing tube vibration only during shipping. Other proposals were adapted for preventing tube vibration only during use.

The device of the present invention is adapted for preventing vibration of U-shaped tubes during shipment as well as during use without reducing the efficiency of the heat exchanger.

Accordingly, it is a general object of this invention to provide an anti-vibration device for U-shaped tubes of a heat exchanger during shipment.

It is another object to provide an anti-vibration device for U-shaped tubes of a heat exchanger during use.

Another object of this invention is to provide a device for preventing vibration between tubes of a heat exchanger during shipment and use.

Finally, it is an object of this invention to provide an improved anti-vibration crate for heat exchange tubes which incorporates the foregoing desirata in an inexpensive manner and with simplified maintenance and operation.

These and other objects and advantages apparent to those skilled in the art from the following description and claims may be obtained, the stated results achieved and described difficulties overcome by the discoveries, principles, apparatus, parts, combinations, subcombinations and elements which comprise the present invention, the nature of which is set forth in the following statement, a preferred embodiment of which—illustrative of the best mode in which application has contemplated applying the principles—is set forth in the following description, and which is particularly and distinctly pointed out and set forth in the appended claims forming part hereof.

The nature of the improvements in the anti-vibration crate for heat exchanger tubes of the present invention may be stated in general terms as including a bundle of heat exchange tubes having a U-shaped construction with opposite ends of the tubes being seated in a tube sheet, the tubes being disposed in a plurality of parallel rows, the U-bent portions of the tubes being concentrically disposed in tube layers, a spacer bar between adjacent tube layers, the spacer bars being aligned and having end portions disposed at the center of the U-bends, an elongated shaft extending through the aligned apertures, the other ends of the spacer bars extending slightly beyond the extremities of the largest U-tube in each row of tubes, a semicircular-like strap extending around and between the other ends of the spacer bars, opposite ends of the strap being secured to the opposite ends of the shaft, and the strap being welded to the end of each spacer bar.

The preferred embodiment of the invention is illustrated, by way of example, in the accompanying drawings wherein:

Fig. 1 is a partial diagrammatic view of a bundle of U-shaped tubes showing the tube crate attached thereto;

Fig. 2 is an enlarged fragmentary perspective view of the assembly of Fig. 1;

Fig. 3 is an enlarged fragmentary horizontal view of the assembly of Fig. 1;

Fig. 4 is a fragmentary, vertical sectional view taken on the line 4—4 of Fig. 3, and Fig. 5 is a fragmentary end view of the assembly of Fig. 1.

Similar numerals refer to similar parts throughout the drawings.

Referring to Fig. 1, a bundle 1 of U-tubes are connected to a tube sheet 2 forming an assembled tube-to-tube sheet unit of a type that is shipped as a replacement for similar worn out units. The bundle 1 includes a plurality of tubes 3 having U-bent portions 4 (Fig. 3). The typical outside diameter of the tubes 3 is 5%" to 2". The tubes of any given bundle may be 1". The tubes 3 are arranged in horizontal rows across the tube sheet 2 so that each row of tubes forms a layer of tubes 3 at equally spaced levels as shown in Fig. 4. The tubes 3 in each layer have U-bent portions of different radii, the inner tubes having smaller diameters than the larger tubes so that the U-bent portions 4 in each layer are concentrically disposed with respect to each other as shown in Fig. 3. The centers of the U-bent portions 4 are within the area enclosed by the smaller inner tube 3.

As shown in Fig. 1, the U-bent portions 4 of the tubes 3 are secured against movement with respect to each other by a crate, generally indicated at 5. The crate includes a plurality of spacer slats or bars 6 (Fig. 4), an elongated shaft or tube 7, and a strap 8.

The spacer slats or bars 6 are separately mounted between adjacent layers of tubes and are of varying length depending upon the number of tubes in adjacent layers. The bars 6 are aligned with each other (Fig. 3) and are preferably disposed in a longitudinal plane dividing the U-tubes into half portions. The bars 6 have inner end portions apertured at 9 and the apertures of all bars 6 are aligned with respect to each other and preferably at the center of the axis of the concentrically U-bent portions 4 of each layer of tubes 3. The outer ends of the slats 6 extend beyond the outer U-bent portion 4 as shown in Fig. 4.

The shaft or tube 7 extends through the aligned apertures 9 of the bars 6 and has extremities extending beyond the upper and lower tube layers as shown in Fig. 5.

The strap 8 is an elongated, generally U-shaped member having opposite end portions apertured to receive the extremities of the tube 7. The junction points of the outer ends of the bars 6 and the strap 8 are secured together, such as by fillet welds 10 (Figs. 3, 4 and 5). In addition, the strap 8 is secured to the end portions of the tube 7 by fillet welds 11. The extremities of the strap 8 are secured by fillet welds 12 to similar tie rods 13 having nuts 14. The rods 13 extend through staggered baffle plates 15 mounted in a cylindrical member or ring 16.

As shown in Figs. 3, 4 and 5, the assembly of the staggered baffle plates 15 within the ring 16 provides an advantage having two facets. First, the several staggered baffle plates 15 are laterally and longitudinally spaced from each other. Since the plates are relatively narrow compared with the width or cross section of the heat exchanger, they present only a slight barrier and thereby develop little or no pressure drop in the heat exchange fluid passing through the shell containing the tubes. In the second place, the assembly facilitates the handling of large bundles of U-tubes such as that shown in Fig. 1.

Thus, a strap 8 retains the slats 6 and the tubes 3 in tight relationship with respect to each other without reducing the spacing between the tubes in each layer as well as the tubes in different layers. Moreover, the crate 5 in combination with the tubes 3 constitutes a rigid assembly that prevents rubbing, knocking or vibration between the tubes of different layers during shipment and use. In shipment, the tubes 3 are retained rigid against vibration and knocking against each other due to the usual shipping movements. In use, the tubes are retained rigid against vibration and knocking against each other due to movement of heat exchange fluids in and around the tubes.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction shown.

Having now described the features, constructions and principles of invention, the characteristics of the anti-vibration crate for heat exchange tubes, and the advantageous, new and useful results provided; the new and useful discoveries, principles, parts, elements, combinations, subcombinations, structures and arrangements, and mechanical equivalents obvious to those skilled in the art, are set forth in the appended claims.

I claim:

1. Anti-vibration support means for heat exchanger U-tubes disposed in spaced layers and having U-bent portions concentrically arranged in each layer, said support means comprising a crate including a shaft perpendicular to the layers of U-tubes and extending through the U-bends thereof, a strap surrounding the tube U-bends and attached at its ends to opposite ends of the shaft, spacer bars located between adjacent layers of U-tubes, and means connecting opposite ends of each spacer bar to the shaft and the strap.

2. An anti-vibration crate for a heat exchanger having U-tubes disposed in spaced layers with U-tube portions concentrically arranged in each layer, the crate including a spacer bar between adjacent layers of U-bent portions, the bars being aligned with each other and having end portions extending beyond the tubes, an elongated shaft attached to one end of the spacer bars and extending within the tube U-bends, an elongated strap surrounding the tube U-bends, the strap being aligned with the bars and attached to the other end of each bar, the extremities of the strap being attached to opposite ends of the elongated shaft, whereby the assembly of the tubes, spacer bars, shaft, and strap is held snugly together so as to prevent vibration between adjacent parts.

3. An anti-vibration crate for a heat exchanger having U-tubes disposed in spaced layers with U-tube portions concentrically arranged in each layer so that U-tube portions of smallest radii in all layers are aligned, the crate including a spacer bar between adjacent layers of U-bent portions, an elongated shaft attached to one end of the spacer bars and extending within the tube U-bends, an elongated strap surrounding the tube U-bends and having end portions attached to opposite ends of the elongated shaft, the strap being aligned with and attached to the other ends of the spacer bars, a cylindrical member surrounding the tubes on the side of the shaft opposite the U-bends, a plurality of spaced staggered baffle plates extending across and within the cylindrical member, the plates having tube-receiving apertures, and the strap being attached at opposite ends to the cylindrical member, whereby the assembly of the tubes, spacer bars, strap, and cylindrical member is held snugly together so as to prevent vibration between adjacent parts.

4. An anti-vibration crate for a heat exchanger having U-tubes disposed in spaced layers with U-tube portions concentrically arranged in each layer so that U-tube portions of smallest radii in all layers are aligned, the crate including a spacer bar between adjacent layers of U-bent portions, the spacer bars having end portions extending beyond the tubes in each layer, the end portions of one end of each bar having aligned apertures, an elongated shaft extending through the aligned apertures and within the tube U-bends, an elongated strap surrounding the tube U-bends and having end portions attached to opposite ends of the elongated shaft, the strap being aligned with and welded to the other ends of the spacer bars, a cylindrical member surrounding the tubes on the side of the shaft opposite the U-bends, a plurality of spaced staggered baffle plates extending across and within the cylindrical member, the plates having tube-receiving apertures, and the strap being welded at opposite ends to the cylindrical member, whereby the assembly of the tubes, spacer bars, strap, and cylindrical member is held snugly together so as to prevent vibration between adjacent parts.

References Cited in the file of this patent

UNITED STATES PATENTS

| 1,430,769 | Thompson | Oct. 3, 1922 |
| 1,738,848 | Starr | Dec. 10, 1929 |
| 1,882,474 | Black | Oct. 11, 1932 |
| 2,146,614 | Bergdoll | Feb. 7, 1939 |
| 2,467,741 | Hancock | Apr. 19, 1949 |
| 2,728,452 | Kantola et al. | Dec. 27, 1955 |
| 2,780,354 | Groover | Feb. 5, 1957 |

FOREIGN PATENTS

| 324,600 | Italy | Feb. 8, 1935 |